Dec. 5, 1950        C. E. SNYDER        2,532,862
TUBE SIZING APPARATUS
Filed Oct. 10, 1947
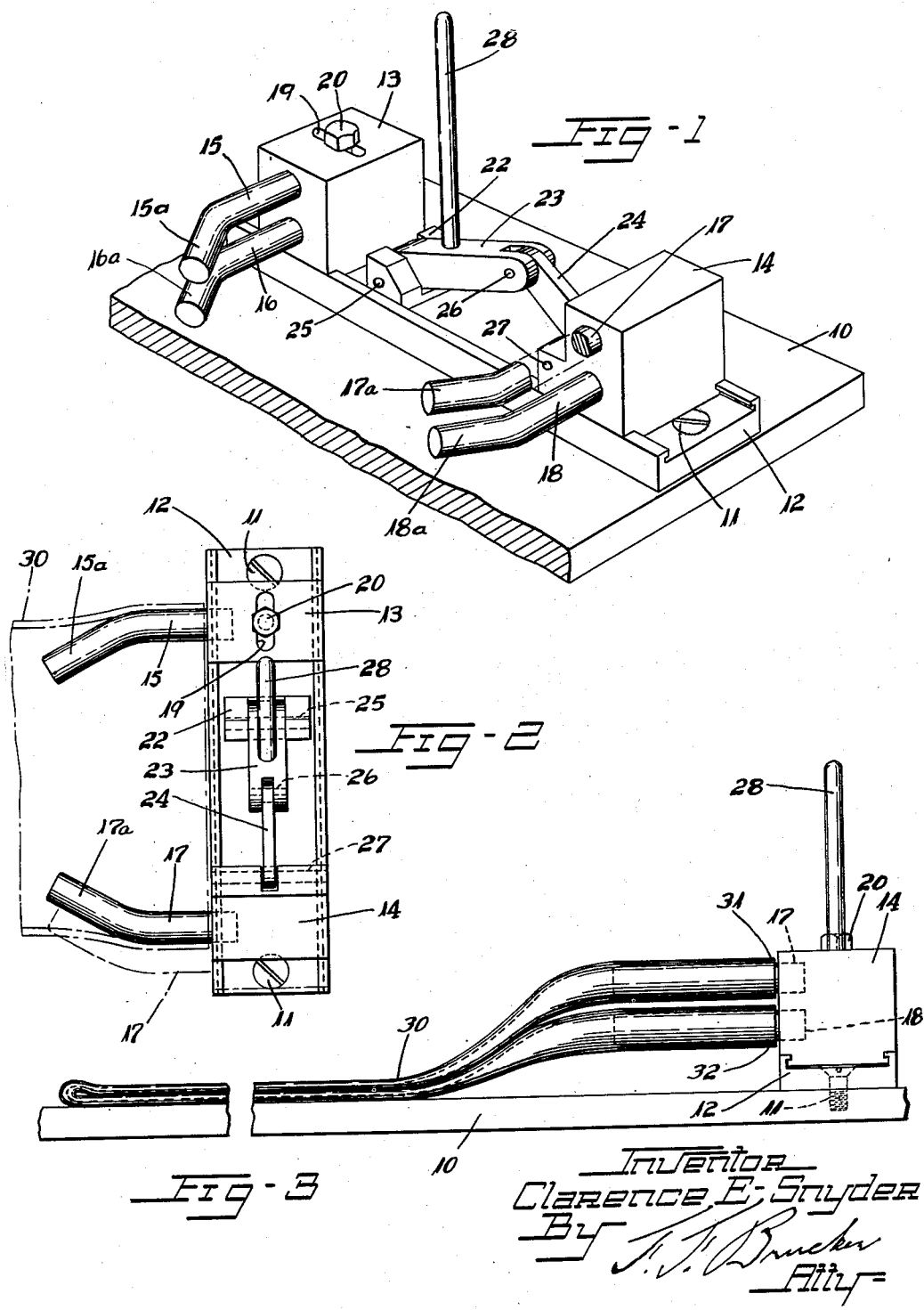

Patented Dec. 5, 1950

2,532,862

UNITED STATES PATENT OFFICE 2,532,862

TUBE SIZING APPARATUS

Clarence E. Snyder, Akron, Ohio, assignor to The B. F. Goodrich Company, New York, N. Y., a corporation of New York Application October 10, 1947, Serial No. 779,157

3 Claims. (Cl. 18—19)

This invention relates to apparatus for sizing the ends of tubular articles of unvulcanized rubber-like material and is especially useful in preparing the ends of unvulcanized inner tubes for tires preparatory to splicing the ends to each other.

In the manufacture of tire inner tubes of rubber or other rubber-like material it has been the practice to extrude the unvulcanized rubber-like material to form a straight tubular body of the material and then to bring the ends of the straight tubular body into adjacent relation while they are trimmed and butt-spliced.

In the butt-splicing machine the adjacent ends of the tube are flattened between clamping members and difficulty has been experienced where the two ends of the tube are not of the same circumference, and therefore not of the same width when flattened, resulting in splices in which the material of the two ends has been off-set at the splice and therefore thin and weak in the region of the folds of the flattened tube. The introduction of synthetic rubber-like materials in the manufacture of inner tubes, and particularly butyl rubber, has increased these difficulties, as with such rubber-like materials it is even more difficult to extrude the rubber-like material to provide a tube of uniform circumference.

It is an object of the present invention to overcome the foregoing and other difficulties in the splicing of tubular articles of unvulcanized rubber-like material. Further objects are to provide for sizing the two ends of tubular material before splicing to pre-stretch the ends of the tube to uniform dimensions, and to provide for holding the ends of the tube in stretched condition.

These and other objects will appear from the following description and the accompanying drawings.

Of the drawings:

Fig. 1 is a perspective view of apparatus constructed in accordance with and embodying the invention, parts being broken away.

Fig. 2 is a plan view of the operating portions of the apparatus showing the ends of the tube mounted thereon.

Fig. 3 is a side elevation of the apparatus with an unvulcanized inner tube mounted thereon, parts being broken away.

Referring to the drawings, the numeral 10 designates a support, which may be the top of a table. Mounted on the support, as by screws 11, is a guide-way 12. A pair of spreading members, in the form of blocks 13, 14, are slidably mounted in the guide-way for movement toward and from each other. The block 13 has a pair of stretching elements 15, 16 secured thereto and projecting therefrom at one side of the guide-way. The block 14 has a similar pair of stretching elements 17, 18 secured thereto and projecting in the same direction. These stretching elements are preferably in the form of round rods, and are so formed that portions thereof adjacent the blocks 13 and 14 are in parallel relation to each other, the elements 15, 17 being spaced apart from each other by the same amount as the spacing of the elements 16, 18. The outer ends of the stretching elements or pins are bent as at 15a, 16a, 17a, 18a so that the ends 15a, 16a converge toward the ends 17a, 18a and engage the tubes remote from their ends to reduce gradually the stretch of the tube beyond its ends and thereby prevent tearing or localized weakening of the tube at the ends of the stretching elements.

The spreading member or block 13 is arranged to be clamped to the guide-way, and for this purpose, it is provided with a through slot 19, elongated in the direction of the guide-way, and a locking screw 20 extends through the slot 19, threaded into the guide-way 12, to clamp the block in any desired position.

Means is provided for moving the spreading member or block 14 toward and from the block 13, and for this purpose, a bifurcated fulcrum block 22 is fixed to the guide-way 12, and toggle means, comprising links 23, 24, is provided between the fulcrum block and the stretching member 14. The link 23 is pivoted to the fulcrum block at one end by the pin 25, the other end of the link being pivotally connected, as at 26, to the link 24. The link 24 is pivotally connected by a pin 27 to the spreading member or block 14. A lever 28 is secured in the link 23 and is so arranged that when the lever is moved to the left, as seen in Fig. 1, the block 14 is moved toward the block 13, and when the lever 28 is moved in the opposite direction, the block 14 is moved away from block 13. In the dead center position of the toggle, where the block 14 has reached its maximum movement in the direction away from the block 13, the block 14 is held in such position by the alignment of the links 23, 24 with each other.

In the operation of the apparatus an unvulcanized inner tube 30 of rubber-like material having open ends 31, 32 is folded upon itself with its ends in substantially super-imposed relation and laid on the support 10. The end 32 of the tube is then slipped over the stretching elements 16, 18, the stretching members being arranged in their closest positions of approach to each other, and the end 31 of the tube is slipped over the stretching elements 15, 17, with the ends of the tube substantially abutting against the blocks 13, 14. The toggle lever 28 is then moved to the right, as seen in Fig. 1, thereby moving the blocks 13, 14 apart and with them the spreading elements, resulting in stretching of the ends of the tube to the same width. The tube is permitted to remain on the stretching apparatus for a length of time at least equal to the cycle of the splicing operation which is sufficient time for the unvulcanizing material to become permanently set at the stretched position. In extruding the rubber-like material of the tube the tolerances are so set that the largest bore of the extruded tube within the permitted tolerances will be slightly stretched when placed on the stretching apparatus. The amount of stretch may be regulated by adjustment of the block 13 with relation to the guideway 12.

Due to the fact that both ends of the tube are stretched to the same dimensions, the tube ends fit the splicing members of the splicing machine more accurately and are of uniform width, so that defective splices are greatly reduced in amount.

Variations may be made without departing from the scope of the invention as it is defined by the following claims.

I claim:

1. Apparatus for simultaneously stretching a pair of open ends of a tubular unvulcanized article of rubber-like material to the same size preliminary to splicing them, said apparatus comprising a pair of spreading members, each member having a pair of spreading elements, all of said spreading elements having portions parallel to each other for engaging the tube at its open ends, and each pair of spreading elements having ends converging toward the elements on the opposite spreading member for engaging the tube remote from its ends to gradually reduce stretching, one element of each pair being adapted to enter one open end of the tube and the other element of each pair being adapted to enter the other open end of the same tube, the parallel portions of the elements adapted to enter each tube being spaced apart by equal amounts, means for spreading the members apart to stretch both ends of the tube simultaneously, and means engaging the spreading members for limiting the spreading movement.

2. Apparatus for simultaneously stretching a pair of open ends of a tubular unvulcanized article of rubber-like material to the same size preliminary to splicing them, said apparatus comprising a pair of spreading members, each member having a pair of spreading elements, all of said spreading elements having portions parallel to each other for engaging the tube at its open ends, and each pair of spreading elements having ends converging toward the elements on the opposite spreading member for engaging the tube remote from its ends to gradually reduce stretching, one element of each pair being adapted to enter one open end of the tube and the other element of each pair being adapted to enter the other open end of the same tube, the parallel portions of the elements adapted to enter each tube being spaced apart by equal amounts, and toggle means for spreading the members apart to stretch both ends of the tube simultaneously, said means including means for locking said members in spaced-apart relation, and means engaging the spreading members for limiting the spreading movement.

3. Apparatus for simultaneously stretching a pair of open ends of an unvulcanized tube of rubber-like material to the same size preliminary to splicing them, said apparatus comprising means for supporting the tube of material with its ends adjacent each other in superimposed relation, a pair of spreading members each having a pair of stretching elements having portions thereof extending therefrom in parallel relation to enter the open ends of the tube, with one element of each pair engaging one end of the tube and the other element of each pair engaging the other end of the same tube, the parallel portions of the elements for entering one end of the tube being equally spaced from each other relative to the elements adapted to enter the other end of the tube, the elements of each spreading member having portions beyond said parallel portions converging toward the elements of the opposite spreading member, means for spreading the stretching members apart to simultaneously stretch the two ends of the tube, and means engaging the spreading members for limiting the spreading movement.

CLARENCE E. SNYDER.

REFERENCES CITED

The following references are of record in the file of this patent:

UNITED STATES PATENTS

| Number | Name | Date |
|---|---|---|
| 202,631 | Chalinor | Apr. 23, 1878 |
| 756,832 | Cleveland | Apr. 12, 1904 |
| 823,711 | Thielmann et al. | June 19, 1906 |
| 1,567,387 | Rode | Dec. 29, 1925 |
| 1,966,064 | Gloor | July 10, 1934 |
| 2,334,841 | Raiche | Nov. 23, 1943 |